Nov. 8, 1927.

C. E. F. AHLM 1,647,981

TRANSMISSION GEARING

Filed Aug. 15, 1924

2 Sheets-Sheet 1

Nov. 8, 1927.

C. E. F. AHLM 1,647,981

TRANSMISSION GEARING

Filed Aug. 15, 1924

2 Sheets-Sheet 2

Inventor
Charles E. F. Ahlm

By Bates, Macklin, Goldrick & Teare
Attorneys

Patented Nov. 8, 1927.

1,647,981

UNITED STATES PATENT OFFICE.

CHARLES E. F. AHLM, OF EAST CLEVELAND, OHIO, ASSIGNOR TO AUTOMOTIVE PATENT HOLDING COMPANY, OF CLEVELAND, OHIO, A CORPORATION OF DELAWARE.

TRANSMISSION GEARING.

Application filed August 15, 1924. Serial No. 732,219.

The object of this invention is to provide a simple and efficient driving mechanism such as is particularly applicable to the transmission gearing of automobiles and which may be associated with an already existing transmission gearing to provide additional speeds in the present type of cars. In this application my invention is shown as adapted for providing an additional speed ratio between the driving shaft and the rear axle, and to transmit and to be capable of clutching these members to cause rotation at the same speed.

More specifically, the objects include provision for shifting of the gear by an arrangement which shall permit the use of substantial roller bearings which may be bodily shifted and shall have a gear carrying shaft movable transversely and longitudinally of its axis. More specific objects include the designing of such an arrangement as will require a minimum number of parts capable of being easily assembled into a comparatively small and compact arrangement of relatively light weight.

Other objects are to so design the unit that it may be readily associated with standard transmission mechanism by being capable of assembly into complete subordinate transmission unit adapted to connect its driving member with the driven member of the present transmission and its driven member with the present ring gear of the differential assembly.

One of the characteristic features of my invention is the arrangement whereby I have provided for shifting the supporting shaft for a driving pinion longitudinally in its bearing, but not relative thereto. That is, I have provided for shifting such a shaft to a plurality of longitudinal positions without occasioning an undesirable overhang of the driving end of the shaft relative to its bearings and I am enabled to thus preserve the most rigid support for this shaft.

In the form shown, I have illustrated a preferred embodiment of my invention adapted for one change of speed only and without reversing mechanisms. Other applications filed by me of even date herewith show different arrangements and provide for more speed changes and a reverse.

Other objects and advantages of my invention will become more apparent in connection with the accompanying description which refers to the drawings. The essential characteristics are summarized in the claims.

Figure 1:
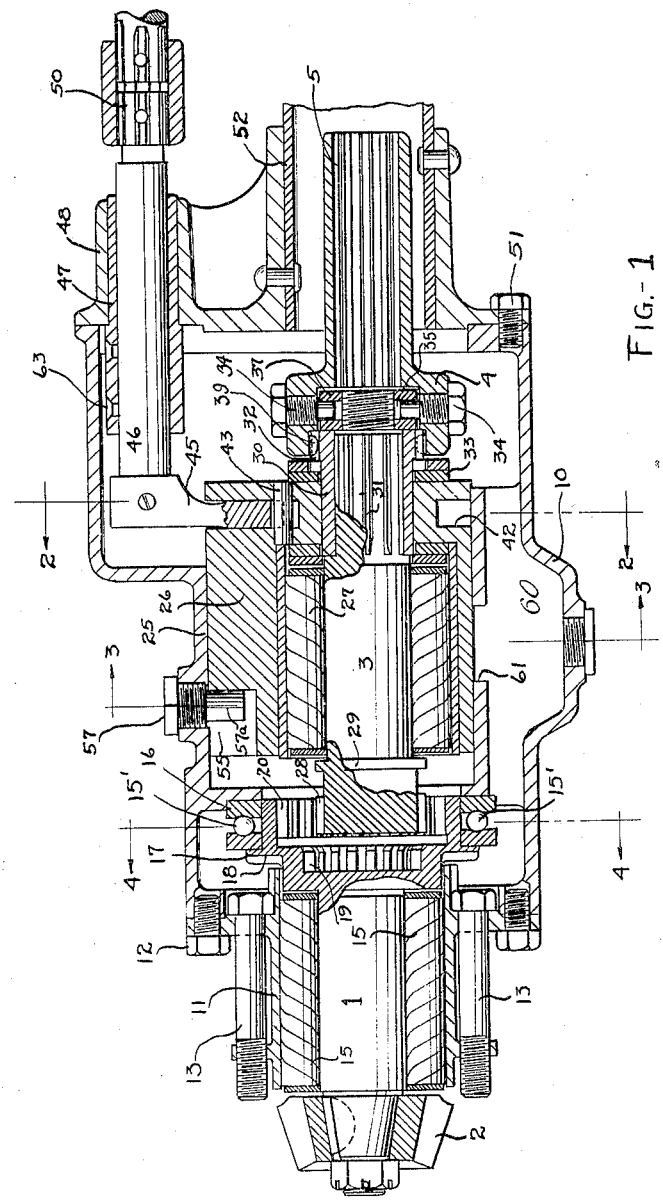
Figure 2:
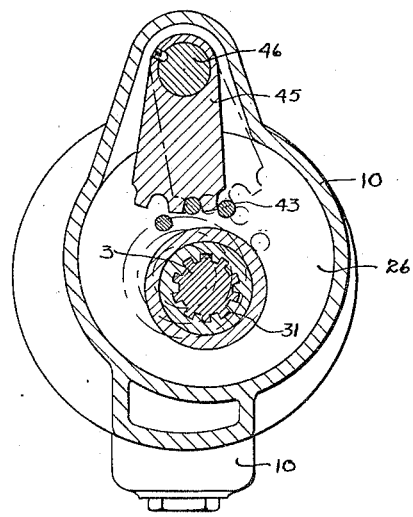
Figure 3:
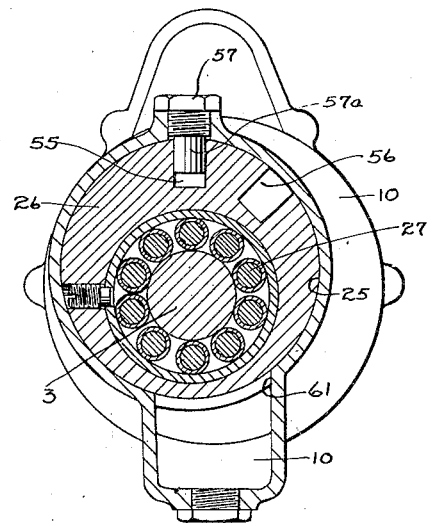
Figure 4:
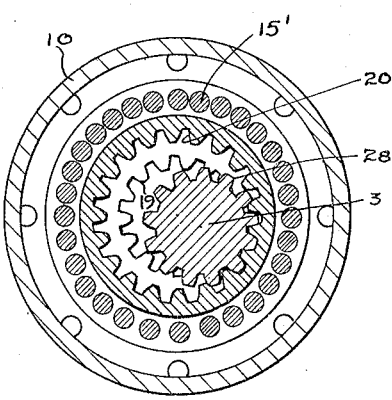

In the drawings Fig. 1 is a substantially central longitudinal section through my transmission mechanism; Fig. 2 is a cross-section taken at right angles thereto along the lines 2—2 of Fig. 1; Fig. 3 is a similar cross-section taken along the lines 3—3 of Fig. 1; Fig. 4 is a cross-section taken along the lines 4—4 of Fig. 1.

Briefly my transmission includes a main housing preferably a casting affording a suitable bearing support for a driving shaft supporting member which shaft I have shown as adapted to engage a splined sleeve for receiving the end of a propeller shaft leading from the existing transmission and which is provided with a universal driving coupling to allow for the movement of the rear axle. The supporting member is shown as a substantial eccentric bearing long enough to receive a generous roller bearing for the shaft, and which is adapted to be either swung bodily or shifted longitudinally by a single member. Suitably supported in one end of this assembled casing and provided with adequate anti-friction bearings, I have arranged the driven shaft which in this case carries a dental clutch and a single internal gear.

Referring to the drawings in detail by the use of reference characters, 1 indicates the driven shaft which may have secured thereto a pinion 2 to connect it to the rear axle gear. A driving member 3 is adapted to engage the driven member and having a slight universal connection at 4 with a flanged sleeve 5 which may slidably engage the propeller shaft (not shown) leading to the engine or more properly to the present transmission.

To support the various parts in co-relation, I prefer to provide housing members, such as the main housing which may consist of a casting indicated at 10. This casting is adapted to support at one end a bearing housing 11 which may be secured thereto by cap screws 12 and adapted to carry forwardly extending studs 13 for attaching the casting 11 to the housing for the differential gearing. Suitable anti-friction bearings such as the rollers 15 serve to support the shaft 1 within the housing 11 and to further provide against possible side play of the shaft and against a longitudinal shifting of the shaft rearwardly, I prefer to provide a rolling bearing 15' between annular races 16 and 17 one carried by the main housing 10 and the other by the head 18 on the shaft 1. Internal gear teeth 19 and 20 are formed within the head 18, concentric with the axis of the shaft 1, which may have their engaging rearward ends beveled or chamfered to facilitate engagement with a driving pinion 28 carried rigid with the shaft 3.

Referring particularly to Figs. 1 and 3, my preferred method of mounting the shaft 3 consists of providing a circular opening 25 within the main housing, its walls being parallel to the axis of rotation of the shaft 1, but having its axial center offset a predetermined distance therefrom. Within this opening is slidably and rotatably mounted a nicely fitting member 26 within which is suitably journaled in roller bearings 27, or the equivalent thereof, the shaft 3. The rear end of this shaft 3 carries gear teeth 28 adapted to mesh with the clutch 19 or gear teeth 20. Forwardly of the teeth 28 the shaft 23 has a shoulder 29 for retaining the roller bearing in place, and suitably flanged or locked to the forward end of the shaft I have shown a sleeve 30 splined thereto at 31 and having peripheral projections 32 exteriorly of its forward end. These projections form a shoulder which bears against the forward end of the member 26, and a nut member 37 which engages threads on the reduced portion of the shaft 3 to hold the projections on the sleeve 30 against the ring 33 thereby preventing excessive longitudinal play of the shaft 3 in the bearing while providing an end adjustment therefor. Inwardly extending reduced ends of a screw 34 carried by the member 4 enter and loosely fit opposed openings 35 in the nut 37 while inwardly facing teeth 39 of the member 4 loosely engage the projections 32 to establish a driving connection between the splined sleeve 5 and the driving pinion shaft 3. The loose fitting teeth and pins just described afford a slight universal movement of the sleeve with reference to the shaft 3, which I have found sufficient to take care of the lateral movement of the shaft consequent upon turning the eccentric member 26 to cause the driving alignment of the pinion and gear. The universal connection just described is particularly adaptable to the type of car exemplified by the present Ford construction. In other constructions a more complete universal driving joint may be provided exteriorly of the casing.

To provide for oscillating the member 26 to bring the pinion 28 selectively into position to engage the teeth 19 or 20 of the driving head, as well as to provide for moving the pinion into positive engagement after such positioning, I have shown a peripheral groove 42 in the forward end of the member 26, which groove is concentric with the shaft 3 and consequently eccentric to the center of rotation of the member 26. Positioned within this groove as shown in Fig. 2, I have provided a series of pins 43 bridging the groove. The member cooperating with these pins preferably consists of a sector 45 rigidly carried by a rod 46 and adapted to be slid and oscillated in a bearing sleeve 47 mounted in a forward housing member 48. The end of the bar 46 projects forwardly to a splined coupling 50 by which the bar may be connected to a suitable operating mechanism (not shown).

The casting 48 may be suitably secured to the forward end of the housing 10 as by cap screws 51 and is provided with a tubular extension 52 large enough to permit the transverse movement of the splined sleeve 5 and the propeller shaft when the eccentric bearing is being rocked to either position.

In order to insure the withdrawal of the teeth 28 entirely from engagement with the gear or clutch teeth before rotating the eccentric bearing 26 I provide longitudinal slots 55 in the periphery of the bearing. Extending from the top portion of the casting 10 into the slot, I provide a suitable positioning pin 57 as shown in Figs. 1 and 3. Fig. 1 shows the pinion teeth 28 in engagement with the teeth 20 in which position the reduced portion 57° of the pin occupies the slot 55. It is apparent that in order to move the pinion from this position it will first have to be withdrawn in a direction parallel to the side faces of the teeth a distance which will permit the pin to clear the slot, and thereafter it may be brought to position and into axial alignment with the shaft 1 by the necessary angular movement of the eccentric 26 to bring the slot 56 into alignment with the pin. This is accomplished by the rotation of the toothed member 45 against the pins 43, and after this rocking movement is completed the same member 45 is used to push the eccentric bearing 26 rearwardly until the teeth 28 engage the clutch teeth 19. To return to the reduced speed position this operation is simply reversed.

In order to provide for adequately oiling all of the bearings, oil may be poured into the main casing until the well 60 has been completely filled. Access for oil to the eccentric bearing may be had through a cutaway portion of the bearing shell 61 centrally of its normal bearing upon the eccentric, from whence the oil will feed along the bearing in either direction to lubricate the gear teeth and the roller bearings 27. There will be enough splash of the oil within the casing to reach the groove 42 to lubricate the pin and sector connection between the eccentric bearing and the operating bar.

It will be seen that by this arrangement I have provided an additional speed change for each already existing speed of a car. The car to which the illustrated embodiment is best adapted has two forward speeds. The interposition of the unit as described results in a lower "low" speed and a lower "high" speed, that is to say in a new low and an extra intermediate speed. To provide a higher "low" and a higher "high" speed it would be simply necessary to reverse the positions of the driving and driven members.

I claim:—

1. In a transmission mechanism in combination, a casing, a member adapted to rotate therewithin and having an internal gear and internal dental clutch mounted upon one end thereof and within the casing, a bearing member adapted to be rotated and moved longitudinally of the casing, a shaft having a pinion, said shaft being mounted to rotate within said bearing member and to be held therein against longitudinal movement relative thereto, and adapted to be moved into and out of alignment with said first named rotatable member by the rotative movement of said bearing, and means including projections on the bearing member and a shiftable bar carried by the casing, having a gear member cooperating with the projections for first causing the rotation of the bearing to selectively bring the teeth of the pinion into operative alignment with the gear and clutch teeth and subsequently to shift the teeth into positive engagement.

2. In combination a casing, a member adapted to rotate therewithin and having an internal gear and a dental clutch mounted upon one end thereof, an eccentric bearing member bodily movable in two directions, one of said movements being parallel to the axis of rotation of said first named member, a shaft mounted to rotate within said bearing, a pinion rigid with the shaft, and adapted to be moved into and out of alignment with said internal gear and clutch by the rotative movement of said bearing, and means including a movable bar carried by the casing, and a geared connection between the bar and eccentric bearing for rotating the bearing.

3. The combination with a driving member and a driven member, one member having an internal gear and a dental clutch, the other member having an external pinion, an eccentric bearing adapted to carry one of said members and mounted to be moved longitudinally relative to the other of said members, means including a peripheral groove in the bearing and a tongue extending into the groove for causing longitudinal movement of the bearing and means including teeth on the tongue member and members located in the groove and cooperating with the teeth for subsequently causing rotation of the bearing to selectively shift the teeth of the pinion into alignment with the teeth of the gear and clutch.

4. In combination, a casing, a pair of rotatable members carried by the casing, an internal gear and an internal dental clutch carried by one of said members, an external gear rigid with the other of said members and adapted to selectively engage and disengage the internal gear and clutch, a swingable and longitudinally shiftable mounting for one of said members, whereby the internal and external members may be brought into driving engagement, and means, including an operating member having a connection with the mounting for effecting both of such swinging and shifting movements, said connection including arcuately arranged members carried on the mounting and a gear sector cooperating therewith and means for permitting relative rotational movement between the sector and mounting and for preventing relative longitudinal movement therebetween.

In testimony whereof, I hereunto affix my signature.

CHARLES E. F. AHLM.